UNITED STATES PATENT OFFICE.

WALTER THILO SCHREIBER, OF BALTIMORE, MARYLAND, ASSIGNOR TO U. S. INDUSTRIAL ALCOHOL CO., A CORPORATION OF WEST VIRGINIA.

PROCESS OF PRODUCING LIQUID FUEL.

1,405,806.     Specification of Letters Patent.     Patented Feb. 7, 1922.

No Drawing. Original application filed January 31, 1918, Serial No. 214,753. Divided and this application filed May 28, 1921. Serial No. 473,498.

*To all whom it may concern:*

Be it known that I, WALTER T. SCHREIBER, a citizen of the United States, residing at Baltimore, in the State of Maryland, have invented a certain new and useful Process of Producing Liquid Fuel, of which the following is a specification.

My invention relates particularly to fuels designed to be used in any desired manner, but it has application especially to fuels adapted to be used as a source of power, as for example fuels for burners and motor fuels, as well as the process of producing the same.

This case is a division of applicant's case Serial No. 214,753, filed January 31, 1918.

The object of my invention is to produce a fuel containing a light hydrocarbon, as well as alcohol and an ingredient adapted to blend the same or to form a solution with the hydrocarbon and alcohol.

A further object of my invention is to provide a fuel of this character which is of such a nature that only a very small quantity of the third ingredient is found necessary.

A further object is to provide a fuel of this character which contains a large percentage of the light hydrocarbon, notwithstanding the small percentage of the third ingredient.

A further object of my invention is to provide a fuel of this character in which the third ingredient is acetylene.

A further object of my invention is to provide a fuel of this character which contains dehydrated alcohol or absolute alcohol.

A further object of my invention is to provide an advantageous process for dehydrating the alcohol.

Further objects of my invention will appear from the detailed description thereof contained hereinafter.

While my invention is capable of being carried out in many different ways, for the purpose of illustration I shall describe only certain ways of carrying out the same herein.

For example, a fuel made in accordance with my invention may be made as follows: 50 c. c. of ethyl alcohol which may have been previously partially dehydrated or not as desired, mixed with 50 c. c. of gasoline and 40 c. c. of kerosene, are introduced into a container and an excess of calcium carbide usually amounting to 10 grams is then added thereto. The mixture is then allowed to stand for one or more days until eventually all of the acetylene produced dissolves in the mixture. The contents of the container are then drawn off and filtered so as to remove the calcium hydroxide and any undecomposed calcium carbide, thus leaving a homogeneous mixture containing dehydrated alcohol, gasoline and kerosene containing approximately 1% of acetylene.

Furthermore, if it is desired to add more acetylene, this may be done by adding thereto 15 c. c. of acetone saturated with acetylene.

The dehydration of the alcohol very materially assists in the blending of the same with the gasoline and kerosene and the acetylene contained in the mixture also assists, to some extent, in accomplishing the same end.

The addition of the acetylene to the fuel, furthermore, assists in improving the character of the fuel by increasing its explosibility. This is especially advantageous where the fuel is to be used as a motor fuel. Where acetone is added, this also has a similar effect in increasing the readiness with which the mixture explodes when used as a fuel.

It will be understood that the dehydrated alcohol need not necessarily be of the strength above referred to, but may be of any strength above the 95% strength obtained commercially.

It is noted that the described hydrocarbons are saturated and that there are no unsaturated compounds in the mixture, which might undergo interactions as for example oxidation to coagulate the fuel or interfere with its efficiency.

As many apparently widely different embodiments of this invention may be made without departing from the spirit thereof, it is to be understood that I do not intend to limit myself to the specific embodiment thereof except as indicated in the appended claims.

I claim:

1. The process of making a fuel comprising forming a composition consisting of aqueous alcohol, a light hydrocarbon resulting from petroleum distillation, and a heavier hydrocarbon, adding to this composition calcium carbide to dehydrate it, and allowing the acetylene formed to dissolve therein, whereby a suitable composition is formed which will not separate into its constituents at low temperatures.

2. The process of making a fuel comprising forming a composition consisting of aqueous alcohol, a light hydrocarbon resulting from petroleum distillation, and a heavier hydrocarbon, and adding to this composition calcium carbide to dehydrate it, whereby a permanent mixture is formed.

3. The process of making a fuel comprising forming a composition comprising aqueous alcohol, a light hydrocarbon resulting from petroleum distillation, and a heavier liquid hydrocarbon stable in the air, adding to this composition calcium carbide to dehydrate it, and allowing the acetylene formed to dissolve therein, whereby a permanent mixture is formed.

4. The process of making a fuel comprising forming a composition comprising aqueous alcohol, a light hydrocarbon resulting from petroleum distillation, and a heavier hydrocarbon, the composition being free of constituents which oxidize in the air to form gummy substances, and adding to this composition a carbide to dehydrate it, whereby a permanent mixture is formed which will not separate at low temperatures.

5. The process of making a fuel comprising forming a composition comprising aqueous alcohol, a light hydrocarbon resulting from petroleum distillation, and a heavier liquid hydrocarbon, the composition being free of hydrocarbons which readily oxidize to form gummy materials, adding to this composition a carbide to dehydrate it, and allowing the acetylene formed to dissolve therein, whereby a permanent mixture is formed which will not separate at low temperatures.

In testimony that I claim the foregoing, I have hereunto set my hand this 3d day of May, 1921.

WALTER THILO SCHREIBER.